United States Patent
Jacquemin et al.

(10) Patent No.: US 10,914,332 B1
(45) Date of Patent: Feb. 9, 2021

(54) PRESSURE DIFFERENTIAL PAYLOAD RELEASE MECHANISM

(71) Applicant: United States of America as Represented by the Secretary of the Navy, Arlington, VA (US)

(72) Inventors: Joseph W. Jacquemin, Panama City, FL (US); Bryan C. Reynoso, Panama City, FL (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 568 days.

(21) Appl. No.: 15/941,875

(22) Filed: Mar. 30, 2018

(51) Int. Cl.
| | | |
|---|---|---|
| *B64D 1/12* | (2006.01) | |
| *F16B 7/04* | (2006.01) | |
| *B63B 21/50* | (2006.01) | |
| *B63B 21/22* | (2006.01) | |

(52) U.S. Cl.
CPC .............. *F16B 7/042* (2013.01); *B63B 21/22* (2013.01); *B63B 21/50* (2013.01); *B64D 1/12* (2013.01)

(58) Field of Classification Search
CPC ... B64D 1/00; B64D 1/02; B64D 1/04; B64D 1/06; B64D 1/12; B63B 21/22; B63B 21/50
See application file for complete search history.

(56) References Cited

U.S. PATENT DOCUMENTS

| | | | | |
|---|---|---|---|---|
| 2,420,746 A | * | 5/1947 | Heidman | B64D 17/383 294/82.25 |
| 2,888,294 A | * | 5/1959 | Savarieau | B64D 1/04 294/82.26 |
| 3,010,752 A | * | 11/1961 | Geffner | F42B 3/006 294/82.28 |
| 3,887,150 A | * | 6/1975 | Jakubowski, Jr. | B64D 1/06 244/137.4 |
| 4,120,232 A | * | 10/1978 | Hoffman, Jr. | B64D 1/06 244/137.4 |
| 4,405,263 A | * | 9/1983 | Hall | B63C 11/52 114/294 |
| 4,441,674 A | * | 4/1984 | Holtrop | B64D 1/06 244/137.4 |
| 4,523,731 A | * | 6/1985 | Buitekant | B64D 1/02 24/453 |
| 4,635,536 A | * | 1/1987 | Liu | F15B 15/261 92/24 |
| 5,107,749 A | * | 4/1992 | Norrvi | F16B 4/002 244/137.4 |
| 6,347,768 B1 | * | 2/2002 | Jakubowski, Jr. | B64D 1/04 244/137.4 |

(Continued)

Primary Examiner — Daniel J Wiley
(74) Attorney, Agent, or Firm — James T. Shepherd

(57) ABSTRACT

A payload release mechanism is provided, which operates utilizing a pressure differential between the mechanism and the surrounding medium. A piston is movably seated within a chamber of the release mechanism. The piston serves to seal the chamber from the surrounding medium, though one end of the piston is in communication with the surrounding medium. The pressure differential between the end of the piston in communication with the surrounding medium and the medium within the chamber causes the piston to move. The piston movement is used to trigger the release of the payload. The amount of movement which triggers the release can be calibrated to correspond to a predetermined pressure differential.

16 Claims, 6 Drawing Sheets

(56) References Cited

U.S. PATENT DOCUMENTS

| | | | | |
|---|---|---|---|---|
| 6,892,985 B2* | 5/2005 | Jakubowski, Jr. | ....... | B64D 1/02 |
| | | | | 244/137.4 |
| 6,948,685 B2* | 9/2005 | Hawthorne | ......... | E05B 47/0002 |
| | | | | 244/129.1 |
| 8,267,612 B2* | 9/2012 | Yeh | .......................... | B25J 15/00 |
| | | | | 403/322.2 |
| 9,163,650 B2* | 10/2015 | Crowder | ............... | F15B 15/261 |
| 9,314,001 B2* | 4/2016 | Siwak | .................. | A01K 27/005 |

* cited by examiner

PRESSURE DIFFERENTIAL PAYLOAD RELEASE MECHANISM

STATEMENT OF GOVERNMENT INTEREST

The invention described herein was assigned to the United States Navy and may be used or manufactured by or for the Government of the United States of America for government purposes without payment of royalties. The invention may be available for licensing for commercial purposes; inquiries should be directed to the Naval Surface Warfare Center Panama City Division.

BACKGROUND OF THE INVENTION

(1) Field of the Invention

The present invention relates to payload release mechanisms. More particularly, the present invention relates to a payload release mechanism utilizing a pressure differential between the pressure in an enclosed chamber within the mechanism and ambient pressure surrounding the mechanism.

(2) Description of the Prior Art

There exist a number of scenarios in which a payload carried by a host vehicle must be released remotely. For example, it may be desired to anchor an autonomous underwater vehicle at a certain depth range. In this example, the payload may be the anchoring mechanism. In a further example, a weather balloon may release an instrument payload at a certain altitude range.

Currently, state of the art payload release mechanisms include electrically powered actuators, burn wires, magnetic release mechanisms and spring powered mechanisms. All these mechanisms either require human input to provide a release signal, stored mechanical power, or electrical power. Generally, such mechanisms add unwanted weight to the host vehicle-payload system.

Thus, a need exists for a payload release mechanism, which automatically releases the payload without human input at the time of release. Additionally, there is a need for a payload release mechanism which can release the payload without having stored mechanical or electrical power on board the host vehicle. Further, a payload release mechanism is needed which reduces the overall complexity of a host vehicle-payload system compared with current systems.

SUMMARY OF THE INVENTION

It is therefore an object of this present invention to provide a payload release mechanism not requiring human input at the time of release. In addition, it is an object of the present invention to provide a payload release mechanism not requiring stored mechanical power or electrical power. A further object is to provide a payload release mechanism which will reduce the overall complexity of a host vehicle-payload system compared with current systems.

The invention includes a release mechanism, which operates utilizing a pressure differential between the mechanism and the surrounding medium. A piston is movably seated within a chamber of the release mechanism. The piston serves to seal the chamber from the surrounding medium, though one end of the piston is in communication with the surrounding medium.

The pressure differential between the end of the piston in communication with the surrounding medium and the medium within the chamber causes the piston to move. The piston movement is used to trigger the release of the payload. The amount of movement which triggers the release can be calibrated to correspond to a certain pressure differential.

As the present invention relies only on the pressure differential for actuation, no human input is required at the time of release. In addition, the payload release mechanism does not require stored mechanical power or electrical power. As a result, the overall complexity of a host vehicle-payload system can be reduced compared with current systems. Additionally, the operational endurance of a host vehicle can be increased as the vehicle does not need electrical power to deploy a payload. Instead, the power can be reserved for operation of the host vehicle itself.

There are multiple configurations in which the piston can actuate to release the payload. In one embodiment, a release system includes a mounting, a payload, a chamber within the system having a predetermined pressure therein, and a piston having a first end within the chamber. The piston extends through an opening of the chamber, with the piston sealing the opening of the chamber from the surrounding medium. A distal end of the piston is exposed to the medium and the piston is movable in a first direction within the chamber to expand the chamber and movable in an opposite direction within the chamber to contract the chamber.

A releasable connection between the mounting and the payload is facilitated by the piston. A pressure differential between the predetermined pressure within the chamber and a pressure of the surrounding medium exerts an equalizing force on the piston to move the piston in one of the first direction or the opposite direction to equalize the pressure differential. The movement of the piston releases the connection between the mounting and the payload.

The connection between the mounting and the payload can include a detent circumscribing the piston and a plurality of raceways in either the mounting or the payload. The raceways extend from a surface of the mounting or the payload adjacent to the piston and into the mounting or the payload. Each raceway can contain a bearing, with the bearings being biased in a direction towards the piston, so as to mate within the detent when the detent is aligned with the raceways. The equalizing force on the piston overcomes the biasing of the bearings to move the bearings out of the detent and into the raceways, so as to release the connection.

The connection can further include a shelf on the first end of the piston, with the shelf having a greater dimension than the opening in the chamber to prevent the first end from passing through the opening. The bearings and raceways may be part of the payload. In one embodiment, the payload is an anchor. The release of the payload maintains the mounting at a predetermined depth within the surrounding medium, the depth being dependent on the predetermined pressure.

In one embodiment, the distal end of the piston is attached to the payload and the bearings and raceways may be part of the mounting. The first end of the piston passes through the opening in the chamber when the connection is released. The payload can include sensors, with the payload releasing at a predetermined elevation within the surrounding medium dependent on the predetermined pressure.

In one embodiment, the releasable connection can include a plurality of first magnets positioned about a circumference of the piston and a corresponding plurality of second magnets located in either of the mounting or the payload. The first and second magnets have attractive polarities, such that a magnetic force of the attractive polarities maintains the position of the piston within the chamber. The equalizing force on the piston can overcome the magnetic force to move the piston from its position so as to release the connection.

In one embodiment, a release system can include a mounting, a chamber within the mounting, a cap sealing a first opening of the chamber from a surrounding medium and a piston positioned within the chamber. A first end of the piston is within the chamber and the piston extends through a second opening of the chamber. The piston seals the second opening of the chamber from the surrounding medium. The chamber has a predetermined pressure therein when sealed by the cap and the piston. A distal end of the piston is exposed to the medium and the piston is movable in a first direction within the chamber to contract the chamber.

The system further includes a payload and a releasable connection attaching the payload to the distal end of the piston. A pressure differential between the predetermined pressure within the chamber and a pressure of the surrounding medium exerts an equalizing force on the piston to move the piston in the first direction to equalize the pressure differential. Movement of the piston releases the connection between the piston and the payload. The payload can include an anchor, with release of the payload maintaining the mounting at a predetermined depth within the surrounding medium depth dependent on the predetermined pressure.

The releasable connection can include a detent circumscribing the piston, a plurality of raceways in the payload and a plurality of bearings. The raceways extend from a surface of the payload adjacent to the piston and into the payload. Each one of the bearings is contained within one of the raceways.

The bearings are biased in a direction towards the piston, so as to mate within the detent when the detent is aligned with the raceways. The equalizing force overcomes the biasing of the bearings to move the bearings away from the detent and into the raceways, thus releasing the connection between the piston and the payload.

In one embodiment, the releasable connection can include a plurality of first magnets positioned about a circumference of the piston and a corresponding plurality of second magnets in the payload. The first and second magnets have attractive polarities, such that a magnetic force of the attractive polarities maintains the connection between the piston and the payload. The equalizing force can overcome the magnetic force to move the piston.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like references numerals and symbols designate identical or corresponding parts throughout the several views and wherein.

DESCRIPTION OF THE INVENTION

Figure 1:
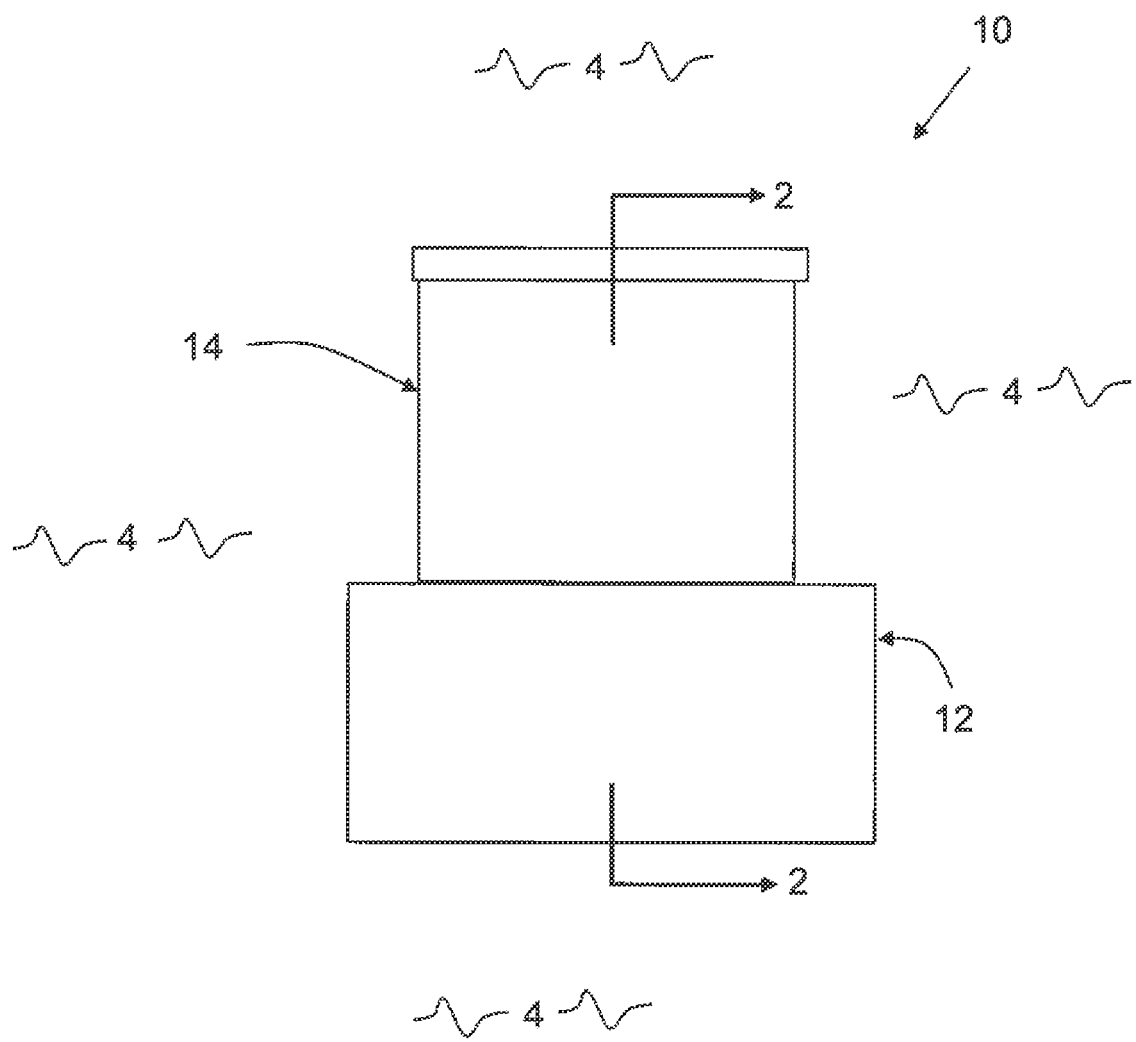
FIG. 1 illustrates a schematic front view of a payload release system.

Referring now to FIG. 1, there is shown a schematic front view of payload release system 10. System 10 includes payload 12 and payload mounting 14. Payload 12 is removably attached to mounting 14, as will be explained in further detail hereinafter. As system 10 moves within surrounding medium 4, pressure differentials between a pressure of surrounding medium 4 and an internal pressure within system 10 can result in the separation of payload 12 from mounting 14.

Figure 2:
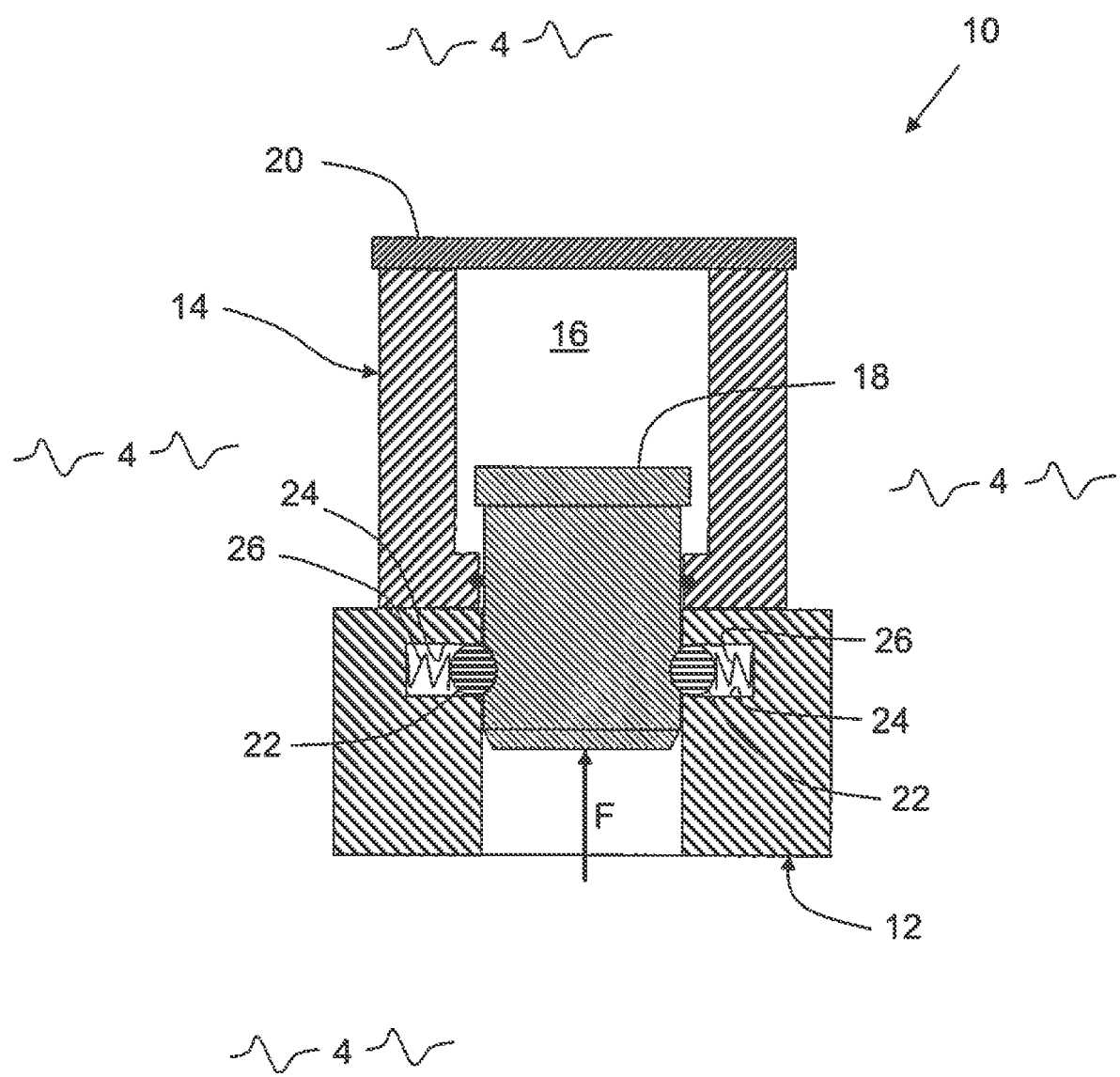
FIG. 2 illustrates a schematic cross-sectional view of the payload release system taken at line 2-2 of FIG. 1.

Referring now to FIG. 2, there is shown a schematic cross-sectional view of system 10 taken at line 2-2 of FIG. 1. Mounting 14 includes internal chamber 16 sealed from surrounding medium 4 by piston 18 and cap 20. Piston 18 is exposed to surrounding medium 4 such that a pressure differential between an internal pressure within chamber 16 and the pressure of surrounding medium 4 can be equalized by movement of piston 18 to compress or expand internal chamber 16.

Payload 12 is secured to mounting 14 by means of a plurality of ball bearings 22, two of which are shown in FIG. 2. Bearings 22 mate with a detent 32 in piston 18. For clarity of illustration, the detent 32 in piston 18 is only identified in FIG. 4. Each bearing 22 is movably contained within raceway 24 and is biased towards piston 18, as illustrated by biasing means 26. For illustrative purposes in FIG. 2, but not for limitation, pressure of surrounding medium 4 is greater than the pressure within chamber 16, such that force F is exerted against piston 18 to compress chamber 16. However, biasing of bearings 22 resists force F.

Figure 3:
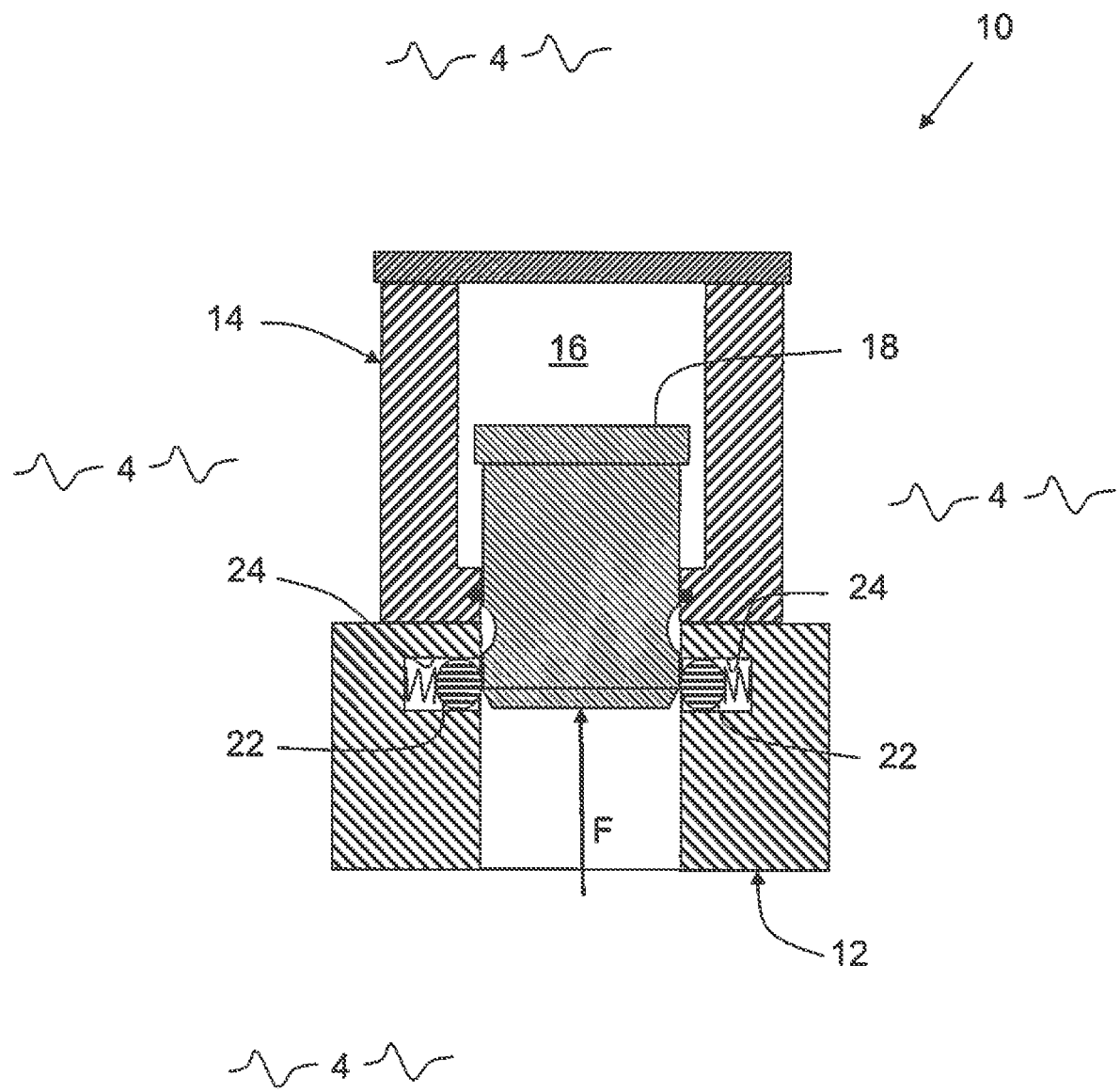
FIG. 3 shows the schematic cross-sectional view of FIG. 2 with the payload release system actuated.

Referring now to FIG. 3, there is shown the schematic cross-sectional view of FIG. 2 with payload release system 10 actuated. As system 10 moves through medium 4, the pressure differential between surrounding medium 4 and chamber 16 can increase, thus increasing force F. In FIG. 3, force F has increased to where force F has overcome biasing of bearings 22. Bearings 22 are moved further into raceways 24 and piston 18 has moved in the direction of force F. With no further connection between payload 12 and mounting 14, payload 12 is free to release from mounting 14.

Figure 4:
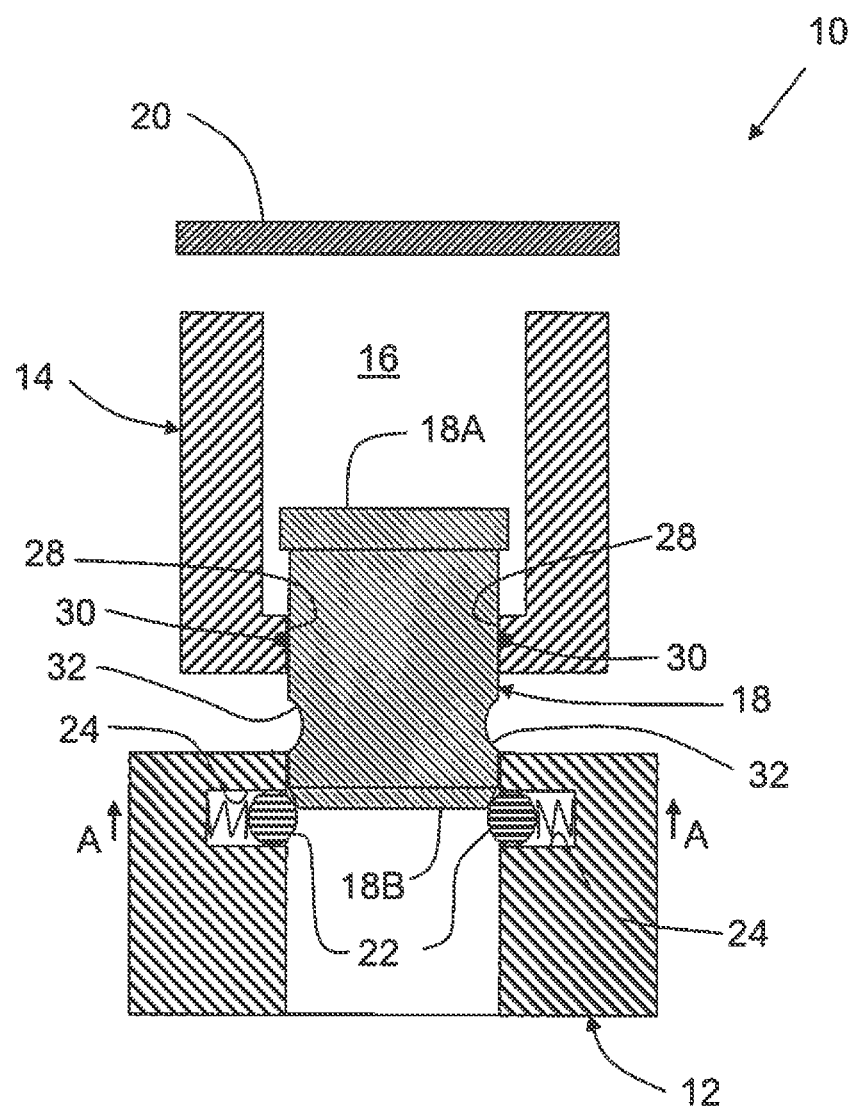
FIG. 4 shows the schematic cross-sectional view of FIG. 2 prior to the payload being connected to a mounting.

As can be seen by those of skill in the art, the connection between piston 18 and payload 12 acts in the manner of a quick disconnect fitting, well known in the art. Referring now to FIG. 4, there is shown the schematic cross-sectional view of FIG. 2 prior to the connection of payload 12 to mounting 14. To connect payload 12 to mounting 14 for the illustrative embodiment shown in FIG. 4, cap 20 is removed and piston 18 is placed within chamber 16 to extend through opening 28 of mounting 14, with o-ring 30 forming the seal about piston 18. Shelf 18A of piston 18 prevents piston 18 from moving completely through opening 28.

Piston 18 protrudes from mounting 14 and payload 12 is forced onto piston 18 in the direction of arrows A. As shoulder 18B of piston 18 first makes contact with bearings 22, bearings begin to be forced into raceways 24. Payload 14 can continue to be moved in the direction of arrow A until bearings 22 are seated in detent 32. When cap 20 is secured over chamber 16, the configuration of system 10 then conforms to that shown in FIG. 2.

What has thus been described is payload release mechanism or system 10, which operates utilizing a pressure differential between the system 10 and the surrounding medium 4. A piston 18 is movably seated within a chamber 16 of the release mechanism 10. The piston 18, together with o-ring 30, serves to seal the chamber 16 from the surrounding medium 4. One end of the piston 18 is in communication with the surrounding medium 4.

The pressure differential between the end of the piston 18 in communication with the surrounding medium 4 and the medium within the chamber 16 causes the piston 18 to move. The piston 18 movement is used to trigger the release of the payload 12.

Figure 5:
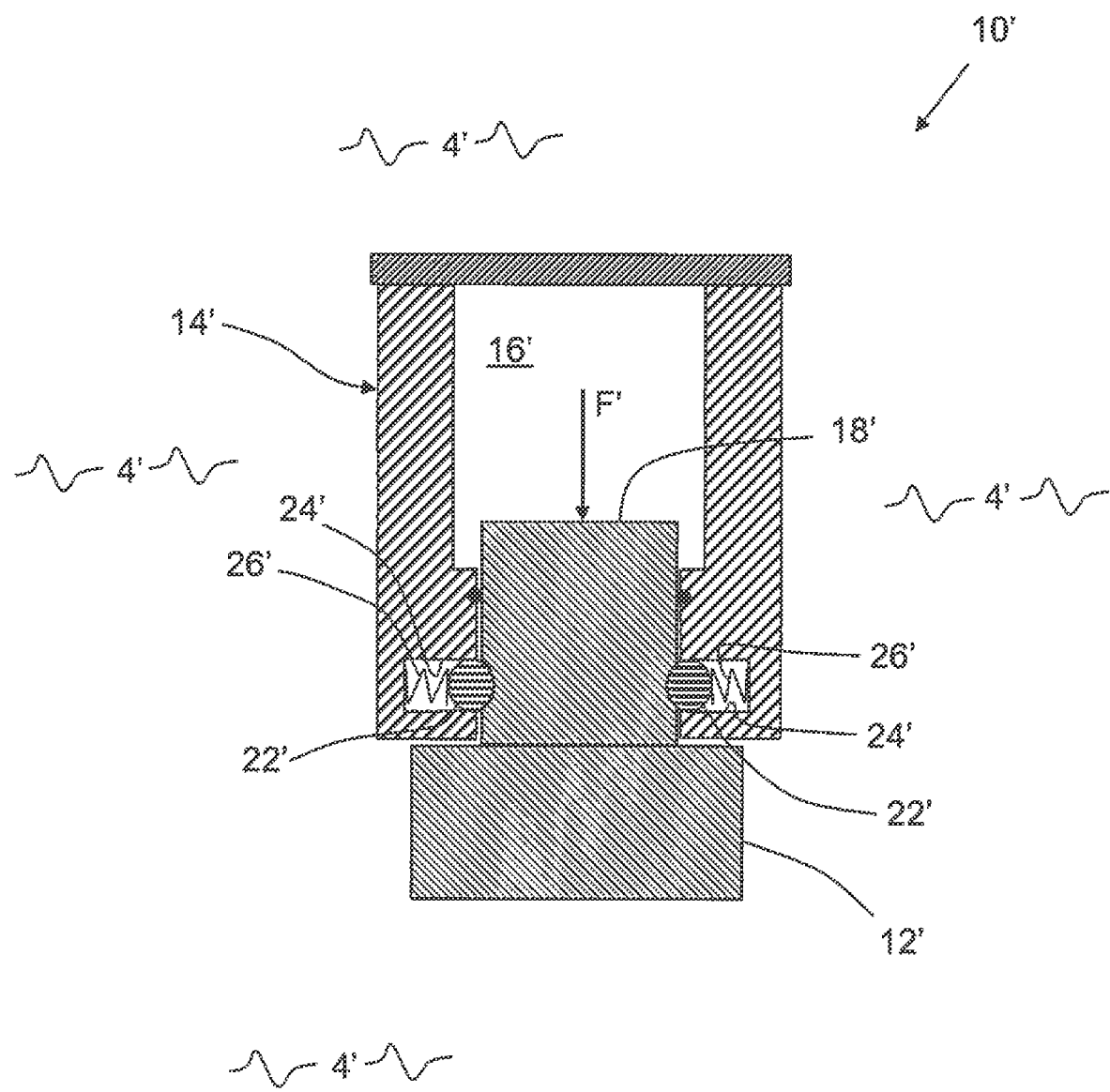
FIG. 5 shows a schematic cross-sectional view of an alternate configuration of the system of FIG. 1.

Obviously, many modifications and variations of the present invention may become apparent in light of the above teachings. As a first example, system 10 can be configured such that the pressure in chamber 16 will exceed that of surrounding medium 4. Referring to FIG. 5, there is shown a cross sectional schematic representation of such a system 10' configuration, where pressure in chamber 16' exceeds ambient pressure of surrounding medium 4'.

In this configuration, mounting 14' includes bearings 22', raceways 24' and biasing means 26'. Payload 12' is attached to piston 18'. When force F' overcomes the biasing of bearings 24', piston 18' and attached payload 12' are free to separate from mounting 14'.

Figure 6:
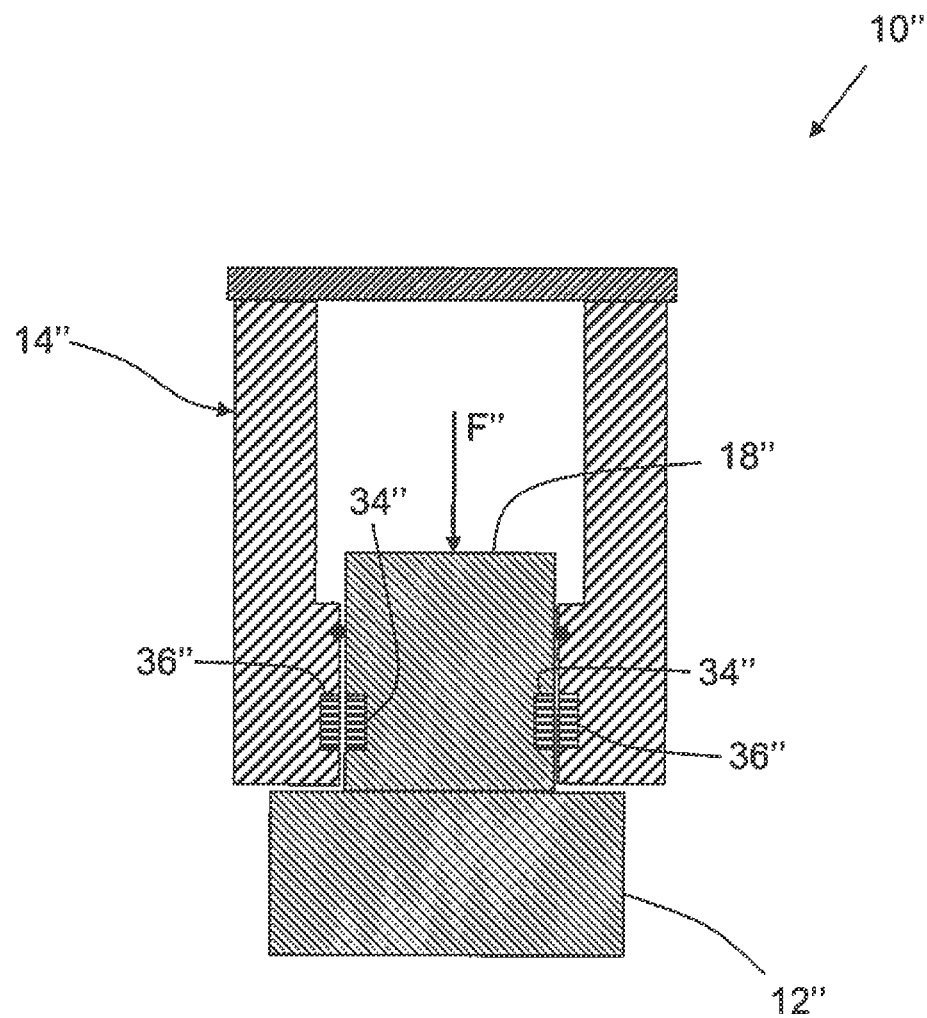
FIG. 6 shows a schematic cross-sectional view of an alternate connection for the system of FIG. 5.

Referring now to FIG. 6, there is shown a cross sectional schematic representation of system 10" having a configuration similar to that of system 10' of FIG. 5. However, in the case of system 10", the connection between payload 12" and mounting 14" can be magnetic. Piston 18" can include magnets 34" and mounting 14" can include magnets 36". The polarity of magnets 34" and 36" can be such that magnets 34" and 36" attract one another and hold piston 18" in place. When force F'" overcomes the magnetic attraction of magnets 34" and 36", piston 18" and attached payload 12" are free to separate from mounting 14".

As is apparent to those of skill in the art, the magnetic connection described with relation to FIG. 6 can be readily applied to the configuration of system 10 described with relation to FIG. 2 through FIG. 4. Those of skill in the art can also recognize the connection between the mounting and the payload can be varied, while still maintaining the functionality of a pressure differential causing the release of the payload.

The systems described herein can have a plurality of applications. For example, payload 12 of system 10 can include an anchoring system for ocean current sensors contained in mounting 14. The pressure within chamber 16 can be calibrated such that force F releases payload 12 at a predetermined depth. With a line (not shown) attaching mounting 14 to payload 12 (in this case, an anchor), and with mounting 14 being buoyant, when it is released payload 12 will pay out line and sink to the ocean bottom to anchor mounting 14.

Alternately, payload 12 can include sensors for obtaining water column parameters as it sinks to the ocean bottom. Similarly, payload 12' of system 10' can include atmospheric sensors, which release at a predetermined elevation as system 10' rises through the atmosphere.

It will be understood that many additional changes in details, materials, steps, and arrangements of parts which have been described herein and illustrated in order to explain the nature of the invention, may be made by those skilled in the art within the principle and scope of the invention as expressed in the appended claims.

What is claimed is:

1. A release system, comprising:
a mounting;
a payload;
a chamber within said mounting having a predetermined pressure therein;
a piston having a first end within said chamber, said piston extending through an opening of said chamber, said piston sealing said opening of said chamber from a surrounding medium, a distal end of said piston being exposed to said medium, said piston being movable in a first direction within said chamber to expand said chamber and being movable in an opposite direction within said chamber to contract said chamber; and
a releasable connection between said mounting and said payload, said connection being facilitated by said piston, wherein a pressure differential between said predetermined pressure within said chamber and a pressure of said surrounding medium exerts an equalizing force on said piston to move said piston in one of said first direction and said opposite direction to equalize said pressure differential, a movement of said piston releasing said connection between said mounting and said payload.

2. The system of claim 1, wherein said releasable connection comprises:
a detent circumscribing said piston;
a plurality of raceways in one of said mounting and said payload, said raceways extending from a surface of said one of said mounting and said payload adjacent to said piston and into said one of said mounting and said payload; and
a plurality of bearings, each one of said bearings contained within one of said raceways, said bearings being biased in a direction away from said surface and towards said piston, said bearings being biased to mate within said detent when said detent is aligned with said raceways.

3. The system of claim 2, wherein said equalizing force on said piston overcomes said biasing of said bearings to move said bearings out of said detent and into said raceways to release said connection.

4. The system of claim 3, wherein said connection further comprises:
a shelf on said first end of said piston, said shelf having a greater dimension than said opening in said chamber to prevent said first end from passing through said opening; and wherein
said payload comprises said bearings and said raceways.

5. The system of claim 4, wherein said payload is an anchor, release of said payload maintaining said mounting at a predetermined depth within said surrounding medium, said depth dependent on said predetermined pressure.

6. The system of claim 3, wherein:
said distal end of said piston is attached to said payload;
said mounting comprises said bearings and said raceways; and
said first end of said piston passes through said opening in said chamber when said connection is released.

7. The system of claim 6, wherein said payload comprises sensors, said payload releasing at a predetermined elevation within said surrounding medium, said elevation dependent on said predetermined pressure.

8. The system of claim 1, wherein said releasable connection comprises:
a plurality of first magnets positioned about a circumference of said piston; and a corresponding plurality of second magnets in one of said mounting and said payload, said first and second magnets having attractive polarities, a magnetic force of said attractive polarities maintaining a position of said piston within said chamber.

9. The system of claim 8, wherein said equalizing force on said piston overcomes said magnetic force to move said piston from said position to release said connection.

10. The system of claim 9, wherein said connection further comprises:
   a shelf on said first end of said piston, said shelf having a greater dimension than said opening in said chamber to prevent said first end from passing through said opening; and wherein
   said payload comprises said second magnets.

11. The system of claim 9, wherein:
   said distal end of said piston is attached to said payload;
   said mounting comprises said second magnets; and
   said first end of said piston passes through said opening in said chamber when said connection is released.

12. A release system, comprising:
   a mounting;
   a chamber within said mounting;
   a cap sealing a first opening of said chamber from a surrounding medium;
   a piston positioned within said chamber and having a first end within said chamber, said piston extending through a second opening of said chamber, said piston sealing said second opening of said chamber from said surrounding medium, said chamber having a predetermined pressure therein when sealed by said cap and said piston, a distal end of said piston being exposed to said medium, said piston being movable in a first direction within said chamber to contract said chamber;
   a payload; and
   a releasable connection attaching said payload to said distal end of said piston, wherein a pressure differential between said predetermined pressure within said chamber and a pressure of said surrounding medium exerts an equalizing force on said piston to move said piston in said first direction to equalize said pressure differential, a movement of said piston releasing said connection between said piston and said payload.

13. The system of claim 12, wherein said releasable connection comprises:
   a detent circumscribing said piston;
   a plurality of raceways in said payload, said raceways extending from a surface of said payload adjacent to said piston and into said payload; and
   a plurality of bearings, each one of said bearings contained within one of said raceways, said bearings being biased in a direction towards said piston, said bearings being biased to mate within said detent when said detent is aligned with said raceways, wherein said equalizing force overcomes said biasing of said bearings to move said bearings away from said detent and into said raceways.

14. The system of claim 13, wherein said payload is an anchor, release of said payload maintaining said mounting at a predetermined depth within said surrounding medium, said depth dependent on said predetermined pressure.

15. The system of claim 12, wherein said releasable connection comprises:
   a plurality of first magnets positioned about a circumference of said piston; and
   a corresponding plurality of second magnets in said payload, said first and second magnets having attractive polarities, a magnetic force of said attractive polarities maintaining said connection between said piston and said payload, said equalizing force overcoming said magnetic force to move said piston.

16. The system of claim 15, wherein said payload is an anchor, release of said payload maintaining said mounting at a predetermined depth within said surrounding medium, said depth dependent on said predetermined pressure.

* * * * *